United States Patent
Schwertfeger et al.

[11] Patent Number: 6,129,949
[45] Date of Patent: Oct. 10, 2000

[54] PROCESS FOR PREPARING ORGANICALLY MODIFIED AEROGELS USING ALCOHOLS, WHEREIN THE RESULTANT SALTS ARE PRECIPITATED

[75] Inventors: Fritz Schwertfeger, Frankfurt; Andreas Zimmermann, Griesheim, both of Germany

[73] Assignee: Hoecsht Research & Technology Deutschland GmbH & Co KG, Frankfurt, Germany

[21] Appl. No.: 09/068,364

[22] PCT Filed: Nov. 5, 1996

[86] PCT No.: PCT/EP96/04820

§ 371 Date: Oct. 26, 1998

§ 102(e) Date: Oct. 26, 1998

[87] PCT Pub. No.: WO97/18161

PCT Pub. Date: May 22, 1997

[30] Foreign Application Priority Data

Nov. 10, 1995 [DE] Germany .......................... 195 41 992

[51] Int. Cl.⁷ .......................... C01B 33/16; C01B 33/18; B01J 13/00
[52] U.S. Cl. .......................... 427/220; 516/87; 516/100; 423/338
[58] Field of Search ..................... 516/87, 100; 502/233; 427/220; 423/338

[56] References Cited

U.S. PATENT DOCUMENTS

| | | | |
|---|---|---|---|
| 2,093,454 | 9/1937 | Kistler | 423/338 |
| 2,249,767 | 7/1941 | Kister | 516/82 |
| 2,285,477 | 6/1942 | White | 516/82 |
| 2,993,005 | 7/1961 | Kosmin et al. | 423/338 |
| 4,053,565 | 10/1977 | Krekeler et al. | 423/338 |
| 4,667,417 | 5/1987 | Graser et al. | 423/338 |
| 5,647,962 | 7/1997 | Jansen et al. | 423/338 |
| 5,738,801 | 4/1998 | Ziegler et al. | 423/338 |
| 5,759,506 | 6/1998 | Jansen et al. | 423/338 |
| 5,795,556 | 8/1998 | Jansen et al. | 423/338 |
| 5,888,425 | 3/1999 | Schwertfeger et al. | 427/220 |

FOREIGN PATENT DOCUMENTS

| | | |
|---|---|---|
| 0658513 A1 | 6/1995 | European Pat. Off. . |
| 3346180 A1 | 8/1985 | Germany . |
| WO 95/06617 | 3/1995 | WIPO . |
| 96/14266 | 5/1996 | WIPO . |

*Primary Examiner*—Richard D. Lovering
*Assistant Examiner*—Daniel S. Metzmaier
*Attorney, Agent, or Firm*—Frommer Lawrence & Haug LLP

[57] ABSTRACT

The invention concerns a process for preparing organically modified aerogels, in which a) a silicic acid sol with a pH $\leq 4.0$ is produced from an aqueous potassium silicate solution using at least one organic and/or inorganic acid; b) the resultant silicic acid sol is polycondensed by the addition of a base to form $SiO_2$ gel; c) the gel produced in step b) is washed with an organic solvent until the water content of the gel is $\leq 5$ wt %; d) the gel obtained in step c) is surface-modified with at least one $C_{1-6}$ alcohol; and e) the surface-modified which are difficult to dissolve in the silicic acid sol. Before step b), the resultant salts, which are difficult to dissolve, are precipitated to the greates possible extent and separated from the silicic acid sol.

18 Claims, No Drawings

PROCESS FOR PREPARING ORGANICALLY MODIFIED AEROGELS USING ALCOHOLS, WHEREIN THE RESULTANT SALTS ARE PRECIPITATED

Process for the preparation of organically modified aerogels by using alcohols, in which process the salts formed are precipitated.

The invention relates to a process for the preparation of organically modified $SiO_2$ aerogels with the use of alcohols, in which process the salts formed are precipitated.

BACKGROUND OF THE INVENTION

1. Field of the Invention

Aerogels, particularly those having porosities over 60% and densities below 0.6 $g/cm^3$ have an extremely low thermal conductivity and for this reason are used as thermal insulating materials, as described e.g. in EP-A-0 171 722.

2. Discription of the Related Art

Aerogels in the broader sense of the term, i.e. in the sense of a "gel with air as dispersing agent," are prepared by drying a suitable gel. Understood by the term "aerogel" in this sense are aerogels considered in the narrow sense, xerogels and cryogels. A dried gel is considered an aerogel in the narrow sense of the term when the liquid of the gel is removed at temperatures above the critical temperature and starting from pressures above the critical pressure. However, if the liquid of the gel is removed under subcritical conditions, e.g. with the formation of a liquid-vapor boundary phase, then the resulting gel is designated as a xerogel. It should be noted that the gels according to the invention are aerogels in the sense of gels with air as dispersing agent.

$SO_2$ aerogels can be prepared e.g. by acid hydrolysis of tetraethyl orthosilicate in ethanol. During the hydrolysis a gel is formed whose structure is determined, among other things, by the temperature, the pH and the duration of the gelation process. However, during the drying of the wet gel the gel structure generally collapses because the capillary forces resulting during drying are extremely great. Collapse of the gel can be prevented by carrying out the drying above the critical temperature and critical pressure of the solvent. Since in this range the liquid/gas phase boundary disappears, the capillary forces also vanish and the gel does not change during the drying process, i.e. no shrinking of the gel during drying will occur, either. Methods of preparation based on this drying technology are disclosed e.g. in EP-A-0 396 076 or WO 92/03378. However, e.g. when ethanol is used, this technique requires a temperature of about 240° C. and pressures over 60 bar. Although the exchange of ethanol against $CO_2$ before drying does reduce the drying temperature to about 30° C., the pressure required is then over 70 bar.

An alternative for the above drying method is offered by a process of subcritical drying of $SiO_2$ gels, if, before drying, the latter are reacted with a chlorine-containing silylating agent. In that case the $SiO_2$ gel can be obtained e.g. by acid hydrolysis of tetraalkoxysilanes, preferably tetraethoxysilane (TEOS) in a suitable solvent, preferably ethanol, by means of water. In a further step, after exchange of the solvent against a suitable organic solvent, the resulting gel is reacted with a chlorine-containing silylating agent. Used as silylating agents, because of their reactivity, are preferably methylchlorosilanes ($Me_{4-n}SiCl_n$, with n=1 to 3). Thereupon the resulting $SiO_2$ gel whose surface has been modified by methylsilyl groups, can be dried in air from an organic solvent. In this way aerogels having densities of less than 0.4 $g/cm^3$ and porosities over 60% can be obtained. WO 94/25149 gives a detailed description of the method of preparation based on this drying technique.

Furthermore, before drying, the above-described gels can be treated in the aqueous alcoholic solution with tetraalkoxysilanes, and then aged, in order to increase the strength of the gel network, as disclosed e.g. in WO 92/20623.

However, the tetraalkoxysilanes used as starting materials in the above-described process are extremely expensive. Furthermore, during silylation with chlorine-containing silylating agents hydrogen chloride (HCL) and a plurality of side products associated therewith will necessarily form, which in some cases require a very expensive and cost-intensive purification of the silylated $SiO_2$ gels by repeated washing with a suitable organic solvent. The particularly corrosion-resistant installations required in this operation are also very expensive. The safety risks associated with the formation of very large amounts of HCl gas will additionally require a very involved technique, and is thus also very cost-intensive.

A first, not inconsiderable cost reduction can be achieved by using water glass as the starting material for the preparation of the $SiO_2$ gels. To this end, a silicic acid can be prepared from an aqueous water glass solution with the aid of ion exchanger resins, which acid will polycondense to a $SiO_2$ gel upon the addition of a base. Then in a further step, after exchange of the aqueous medium against a suitable organic solvent, the resulting gel is reacted with a chlorine-containing silylating agent. Used as silylating agents, because of their reactivity, are preferably methylchlorosilanes ($Me_{4-n}SiCl_n$ with n=1 to 3). The resulting $SiO_2$ gel surface-modified with methylsilyl groups can then also be dried in air from an organic solvent. The method of preparation based on this technique is described e.g. in DE-A-43 42 548.

However the above-described problems of extremely high production costs associated with the use of chlorine-containing silylating agents are not solved by the use of water glass as starting material.

German Patent Application P 19502453.2 describes the use of a chlorine-free silylating agent. This method starts out from the silicate-type lyogel obtained with the above-described process by different methods, and reacted with a chlorine-free silylating agent. Preferably used in this case as silylating agents are methylisopropenoxysilanes ($Me_{4-n}Si(OC(CH_3)CH_2)_n$ with n=1 to 3). Thereupon, the thus resulting $SiO_2$ gel surface-modified with methylsilyl groups can again be dried in air from an organic solvent.

Although the use of chlorine-free silylating agents will solve the problem of HCl formation, the chlorine-free silylating agents used also represent an extremely high cost factor.

WO 95/06617 discloses hydrophobic silicic acid aerogels obtainable by the reaction of a water glass solution with an acid at a pH of from 7.5 to 11, extensive freeing of the resulting silicic acid hydrogel from ionic components by washing with water or dilute aqueous solutions of inorganic bases, —with the pH of the hydrogel maintained in the range of 7.5 to 11—displacement of the aqueous phase contained in the hydrogel by an alcohol, and subsequent supercritical drying of the resulting alcogel.

In this process suitable alcohols for the water exchange are $C_1$–$C_5$ alcohols, preferably $C_3$–$C_5$ alcohols, and isopropanol in particular.

It is known that when the above-mentioned alcohols are used under supercritical conditions (WO 95/06617), esterification of the alcohols with the surface OH groups of the lyogel will take place. As a result, alkoxy-modified aerogels, e.g. isopropoxy-modified aerogels are obtained, which have hydrophobic surface groups.

However, a disadvantageous aspect of the method of preparation disclosed in WO 95/06617 is that the drying requires supercritical conditions which, e.g. for isopropanol, are at a temperature in the range of 240 to 280° C. and at a pressure of about 55 to 90 bar.

OBJECTS OF THE INVENTION

A further unsolved problem are the aqueous salt solutions which are obtained in the preparation of aerogels from water glass. In order to convert a water glass solution into a silicic acid sol capable of condensation, the cations (mostly sodium and/or potassium ions) must be exchanged against protons in the water glass solution. For this purpose, organic and/or inorganic acids may be used. The salts of the above-mentioned cations (e.g. NaCl or $Na_2SO_4$) which will also necessarily be formed in the dissolved state must be washed out from the gel before, during or after gel aging. At present, these highly dilute aqueous salt solutions constitute a great disposal problem, because they can no longer be discharged into rivers or lakes in relatively large quantities. A final disposal which meets current regulations represents an extremely high cost factor.

Hence the object of the present invention was to provide a process for the preparation of aerogels having hydrophobic surface groups, a process which does not have any of the above-described problems known in the prior art. In particular, the process according to the invention should be economical and capable of being carried out in a technically simple manner.

A further object of the present invention was to provide a process for the preparation of organically modified $SiO_2$ aerogels in which no dilute aqueous salt solutions will be formed.

SUMMARY OF THE INVENTION

These objects are met by a process for the preparation of organically modified aerogels, comprising a) the preparation of a silicic acid sol having a pH of ≦4.0 from an aqueous water glass solution with the aid of at least one organic and/or inorganic acid;

b) polycondensation of the resulting silicic acid sol to a $SiO_2$ gel by the addition of a base;

c) washing the gel obtained in Step b) with an organic solvent until the water content of the gel is ≦5% by weight;

d) modifying the surface of the gel obtained in Step c) with at least one $C_1$–$C_6$ alcohol; and e) drying the surface-modified gel obtained in Step d), characterized in that at least one acid forms difficultly soluble salts with the cations of the water glass in the silicic acid sol, and that before Step b), the resulting difficultly soluble salts are extensively precipitated and separated from the silicic acid sol.

DESCRIPTION OF THE PREFERRED EMBODIMENTS

Used as water glass solution in Step a) is generally a 6 to 25% by weight (calculated on the $SiO_2$ content) sodium and/or potassium water glass solution. A 17 to 20% by weight water glass solution is preferred. Furthermore, the water glass solution may also contain up to 90% by weight (calculated on $SiO_2$) of zirconium, aluminum and/or titanium compounds capable of condensation.

The acids used are generally 15 to 50% by weight acids, which form difficultly soluble salts with sodium and/or potassium ions. Mixtures of suitable acids can also be used. Sulfuric, phosphoric, hydrofluoric and oxalic acid are preferred. Sulfuric acid is especially preferred.

To achieve an as complete precipitation and good separation of the difficultly soluble salts formed in Step a) as possible, the silicic acid sol should have a temperature between 0 and 30° C., preferably between 0 and 15° C., and by particular preference between 0 and 5° C. This can be achieved by bringing the water glass solution, the acid and/or the silicic acid sol to a temperature between 0 and 30° C., preferably between 0 and 15° C., and by particular preference between 0 and 5° C. If, in so doing, a supersaturated salt solution should form, the salt can be precipitated by suitable seeding with appropriate seeding crystals. The salts formed are separated by means known to persons skilled in the art, e.g. by filtration, suction filtration, membranes or crystallization vessels. Semi-continuous or continuous processes are preferred.

After the salts have been separated off, the silicic acid sol is adjusted with water to a concentration between 5 and 12% by weight (calculated on the $SiO_2$ content). A 6 to 9% by weight silicic acid solution is particularly preferred.

The polycondensation of the silicic acid sol obtained in Step a) to form a $SiO_2$ gel takes place in Step b) by the addition of a base in a pH region of between 3.0 and 7.0, preferably between 4.0 and 6.0. Used as base is generally $NH_4OH$, NaOH, KOH, $Al(OH)_3$, colloidal silica and/or an alkaline water glass solution. $NH_4OH$, NaOH and KOH are preferred, with NaOH especially preferred. Mixtures of the aforementioned can also be used.

Step b) is generally carried out at a temperature between the freezing point of the solution and 100° C. Optionally, a shaping step, such as spray forming, extrusion or drop formation can simultaneously be carried out.

Before Step c) the gel is preferably aged, an operation generally carried out at 40 to 100° C., preferably at 80 to 100° C., and at a pH of 4 to 11, preferably 5 to 7. The duration of this operation is generally 1 second to 12 hours, preferably 1 second to 5 hours.

Optionally, the aged hydrogel can be washed with water until it is free of electrolytes.

In Step c), the gel obtained in Step b) is washed with an organic solvent until the water content of the gel is ≦5% by weight, preferably ≦2% by weight, and by particular preference ≦1%. Used as solvent are generally aliphatic alcohols, ethers, esters or ketones, as well as aliphatic or aromatic hydrocarbons.

Preferred solvents are $C_1$–$C_5$ alcohols, acetone, tetrahydrofuran, ethyl acetate, dioxane, n-hexane and toluene. Particularly preferred solvents are isopropanol, isobutanol, tert.-butanol and acetone. Mixtures of the aforementioned solvents can also be used. Furthermore, the water can first be washed out with a water-miscible alcohol, and the latter can then be washed out with a hydrocarbon.

Furthermore, the gel obtained in Step c) can additionally be subjected to a solvent exchange. In case of solvent exchange the same solvents may be used, in principle, as in the washing operation of Step c). The solvents preferred for washing are preferred also for the solvent exchange.

Understood by the term "solvent exchange" is not only a one-time exchange of the solvent, but also an optional multiple repetition with different solvents.

The lyogel obtained in Step c) can also be subjected to a further aging process. This is generally done between 20° C. and the boiling point of the organic solvent. Optionally, the aging may also be carried out also under pressure at elevated temperatures. The duration is generally 1 second to 48 hours, preferably 1 second to 24 hours. Such an aging can optionally be followed by a further solvent exchange with the same or different solvent. This additional aging step may optionally be repeated several times.

In Step d) the gel obtained in Step c) is surface-modified with at least one $C_1$–$C_6$ alcohol ion such a way that it is kept in a pressure vessel or autoclave under pressure and elevated temperature.

$C_3$–$C_5$ alcohols, such as isopropanol, isobutanol, tert.-butanol, sec.-pentanol and tert.-pentanol are preferentially used. Isopropanol, isobutanol and tert.-butanol are particularly preferred.

In so doing, the alcohol is generally used in an amount of from 1 to 100% by weight, calculated on the total amount of solvent.

The alcohols may be used alone, in mixtures or with other nonreactive organic solvents or solvent mixtures, such as acetone, tetrahydtrofuran, dioxane, n-hexane or toluene.

The temperatures and pressures for surface modification depend on the respective solvent or solvent mixture used. However they are clearly below the critical temperature and critical pressure of the alcohols used.

A temperature between 25° C. and 220° C., and by particular preference between 150° C. and 220° C. is used.

The pressure is preferably between 1 and 50 bar, and by particular preference between 20 and 50 bar, The times during which the lyogel is maintained under these conditions are preferably between 30 minutes and 20 hours, and by particular preference between 30 minutes and 10 hours.

Small amounts of a silylating agent may be optionally be added. Suitable as silylating agents are generally silanes of formulas $R_{14-n}SiCl_n$ or $R_{14-n} Si (OR^2)_n$ (with n =1 to 3), where $R_1$ and $R^2$, independently of one another, are $C_1$–$C_6$-alkyl, cycloalkyl or phenyl. Isopropenoxysilanes and silazanes are also suitable. Trimethylchlorosilane is preferably used. Furthermore, all silylating agents known to persons skilled in the art may be employed, e.g. even those disclosed in DE-A-44 30 669.

The quantities are generally between 0 and 1% by weight (calculated on the lyogel); the concentrations are preferably between 0 and 0.5% by weight, and with particular preference between 0 and 0.2% by weight.

To speed up the surface-modifying process, water may additionally be present in the system In that case concentrations between 0 and 10% by weight (calculated on the lyogel) are preferred. Moreover, to speed up the process, catalysts known to persons skilled in the art, such as acids, bases or organometallic compounds, may also be present in the system Optionally, the surface-modified gel obtained in Step d) may be subjected to a solvent exchange before Step e). Solvents generally used for this purpose are aliphatic alcohols, ethers, esters or ketones, as well as aliphatic or aromatic hydrocarbons. Mixtures of the aforementioned solvents may also be used. Preferred solvents are methanol, ethanol, i-propanol, acetone, tetrahydrofuran, ethyl acetate, dioxane, n-hexane, n-heptane and toluene. Particularly preferred, as solvent, is i-propanol.

In Step e), the surface-modified and preferably afterwashed gel is dried under subcritical conditions, preferably at temperatures of from −30° C. to 200° C., and particularly between 0 to 100° C. The pressures used for drying are preferably between 0.001 to 20 bar, and by particular preference between 0.01 and 5 bar.

The gel obtained in Step d) may be dried also under supercritical conditions. Depending on the solvent used, this requires temperatures higher than 200° C. and/or pressures higher than 20 bar. This is possible without any problems, but is more expensive and affords no significant advantages.

In general, the drying is continued until the gel has a residual solvent content of less than 0.1% by weight.

In another embodiment the gel may, after the shaping polycondensation in Step b) and/or in any subsequent step, be comminuted by techniques known to persons skilled in the art, e.g. by grinding.

Furthermore, in order to reduce the contribution of radiation to thermal conductivity, the gel may be treated before the gel preparation with IR-opacifying agents, such as carbon black, titanium oxide, iron oxides and/or zirconium oxides.

Furthermore, it is possible to treat the sol with fibers before preparation of the gel, in order to increase its mechanical stability. Suitable for use as fiber materials are inorganic fibers such as glass fibers or mineral fibers, organic fibers such as polyester fibers, aramide fibers, Nylon fibers or fibers of vegetable origin, as well as mixtures thereof. The fibers may also be coated, e.g. polyester fibers metallized with a metal such as aluminum.

In another embodiment the gel, depending on its use, may be subjected before surface modification to an additional network reinforcement. This is done by reacting the resulting gel with a solution of an alkyl and/or aryl orthosilicate capable of condensation and having the formula $R^1_{4-n}Si (OR^2)_n$, where n=2 to 4, and $R_1$ and $R^2$, independently of one another, are linear or branched $C_1$–$C_6$-alkyl groups, cyclohexyl groups or phenyl groups, or with an aqueous silicic acid solution. This network reinforcement can be carried out before and/or after every aging step or solvent exchange.

In another preferred embodiment the gel has, before drying, an E-modulus of more than 3 MPa, a BET surface area of more than 400 m$^2$/g and a pore radius distribution in the range of from 2 to 20 nm, preferably in the range of from 5 to 10 nm, so that the aerogels obtained after subcritical drying preferably have a density of $\leq 200$ kg/m$^3$, and by particular preference a density of $\leq 150$ kg/m$^3$.

Below, the process according to the invention is described in greater detail by means of an embodiment, without thereby limiting said process in any way.

EXAMPLE 1

236 g of 25% $H_2SO_4$ cooled to 0° C. is dropwise treated, under continuous cooling to 0° C., with 707 g of a sodium water glass solution cooled to 7° C. (containing 17% by weight of $SiO_2$ and a $Na_2O:SiO_2$ ratio of 1:3.3). A pH of 1.6 is obtained. The precipitating $Na_2SO_4 \cdot 10 H_2O$ is separated at 0° C. from the silicic acid sol by suction filtration, and the silicic acid sol is diluted with 280 mL of $H_2O$. The resulting silicic acid sol is treated at 5° C. and under stirring with 26 mL of a 1 N NaOH solution, to bring the pH to 4.7. The resulting hydrogel is then aged for 2.5 hours at 85° C.

The modulus of elasticity of the aged hydrogel is 15.5 MPa. It is washed with 2 L of warm water and then extracted with isopropanol, until the water content of the gel is below 2.0% by weight. The isopropanol-containing lyogel is then heated in isopropanol in an autoclave to 220° C. and a pressure of 40 bar, and maintained under these conditions for 3 hours. The gel is dried in air (3 hours at 40° C., then 2 hours at 50° C. and 12 hours at 150° C.).

The resulting transparent aerogel has a density of 0.15 g/cm$^3$. Its specific surface area according to BET is 500 m$^2$/g. The λ value is 0.018 W/mK.

The thermal conductivity was measured by a hot wire method (see e.g. 0. Nielsson, G. Rüschenpöhler, J. Gross and J. Fricke, High Temperatures—High Pressures, Vol. 21, 267–274 (1989)).

What is claimed is:

1. Process for the preparation of organically modified aerogels, comprising
    a) the preparation of a silicic acid sol of pH ≦4.0 from an aqueous water glass solution by means of at least one organic and/or inorganic acid, with at least one acid forming difficultly soluble salts at temperatures between 0° C. and 30° C. with cations of the water glass in the silicic acid sol;
    b) extensively precipitating the resulting difficultly soluble salts at temperatures between 0° C. and 30° C., and separating them from the silicic acid sol;
    c) polycondensing the resulting silicic acid sol by the addition of a base, to form a SiO$_2$ gel;
    d) washing the gel obtained in Step c) with an organic solvent until the water content of the gel is ≦5% by weight;
    e) modifying the surface of the gel obtained in Step d) with at least one C$_1$–C$_6$ alcohol; and
    f) drying the surface-modified gel obtained in Step e).

2. Process according to claim 1 wherein the water glass solution in Step a) is a 6 to 25% by weight sodium and/or potassium water glass solution.

3. Process according to claim 1 wherein said water glass solution contains up to 90% (calculated on SiO$_2$) zirconium, aluminum and/or titanium compounds capable of condensation.

4. Process according to claim 1 wherein said acid of step (a) is 15 to 50% by weight sulfuric acid.

5. Process according to claim 1 wherein the resulting silicic acid sol has a temperature in the range of from 0 to 30° C.

6. Process according to claim 1 wherein said base in Step c) is NaOH, NH$_4$OH, Al(OH)$_3$, colloidal silica, and/or an alkaline water glass solution.

7. Process according to claim 1 wherein the gel is aged before Step d) at 40 to 100° C. and at a pH of 4 to 11 for a period between 1 second and 12 hours.

8. Process according to claim 1 wherein said organic solvent in Step d) is a C$_{1-C5}$-alcohol, acetone, tetrahydrofuran, ethyl acetate, dioxane, n-hexane, n-heptane and/or toluene.

9. Process according to claim 1 wherein before surface modification, the gel obtained in Step c) is reacted with a solution of an alkyl and/or aryl orthosilicate capable of condensation and having the formula, R$_{14-n}$Si(OR$^2$)$_n$, where n=2 to 4, and R$_1$ and R$^2$, independently of one another are linear or branched C$_1$–C$_6$-alkyl groups, cyclohexyl groups or phenyl groups, or with an aqueous silicic acid solution.

10. Process according to claim 1 wherein said alcohol in Step e) is at least one C$_3$–C$_5$ alcohol.

11. Process according to claim 1 wherein said alcohol in Step e) is isobutanol or tert.-butanol.

12. Process according to claim 1, wherein the alcohol is used in an amount of from 1 to 100% by weight, calculated on the whole amount of solvent.

13. Process according to claim 1, wherein the surface modification is carried out at a temperature in the range of from 25° C. to 220° C. and a pressure of from 1 to 50 bar, for a period between 30 minutes and 20 hours.

14. Process according to claim 1, wherein the surface modification is carried out in the presence of small amounts of a silylating agent.

15. Process according to claim 1, wherein the surface modification is carried out in the presence of a catalyst.

16. Process according to claim 1, wherein prior to Step f), the surface-modified gel is subjected to a solvent exchange.

17. Process according to claim 1, wherein the gel is dried in Step f) under subcritical conditions.

18. Process according to claim 1, wherein before the gel preparation, the sol is treated with IR opacifying agents and/or fibers.

* * * * *